INVENTOR.
LEWIS L. BOGNAR
BY
ATTORNEY

INVENTOR.
LEWIS L. BOGNAR
ATTORNEY

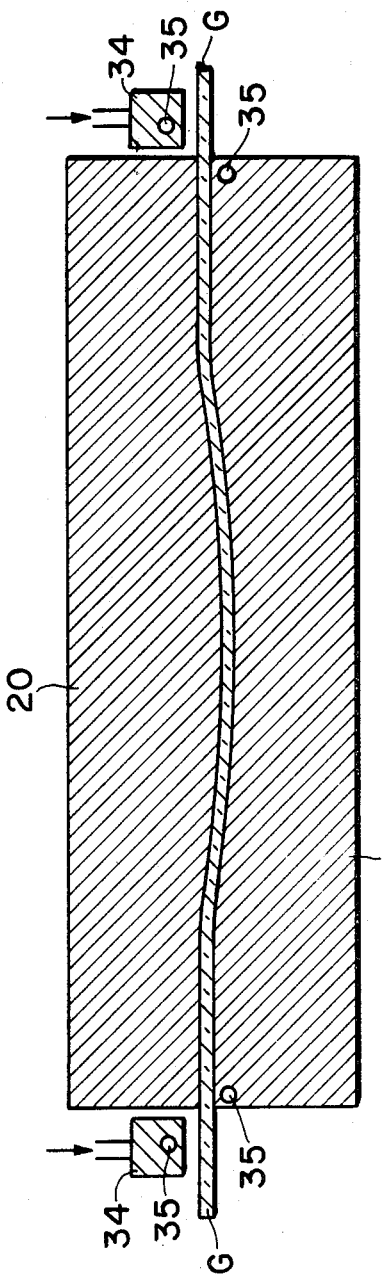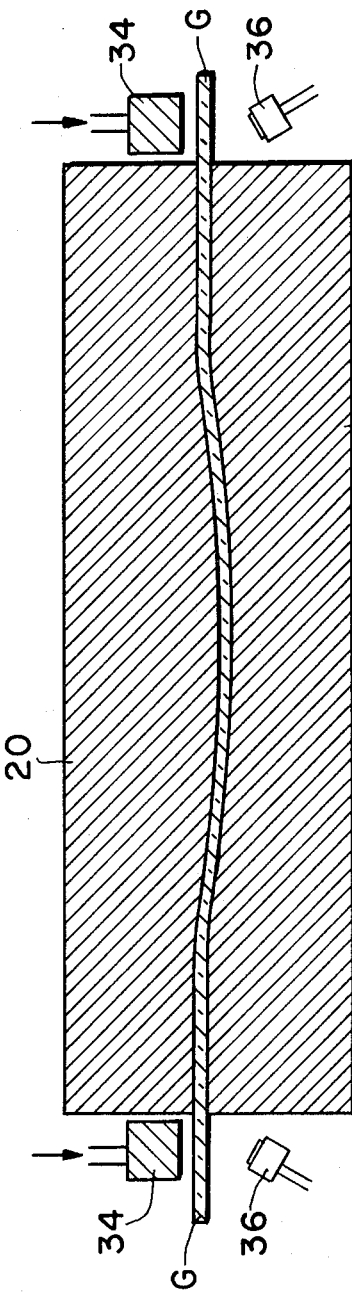

United States Patent Office 3,582,304
Patented June 1, 1971

3,582,304
FORMING ARTICLES FROM SHEET GLASS
Lewis L. Bognar, 410 Beartown Road,
Painted Post, N.Y. 14870
Filed Oct. 5, 1967, Ser. No. 673,123
The portion of the term of the patent subsequent to
July 8, 1986, has been disclaimed
Int. Cl. C03b 23/02
U.S. Cl. 65—105      9 Claims

ABSTRACT OF THE DISCLOSURE

Intricate articles are formed from sheet glass by rapidly heating the sheet above its softening temperature while suspended in a vertical plane from above, and quickly press-forming an article before detrimental attenuation occurs with forming members heated to about the annealing temperature of the glass, so as to form an article having a wall thickness substantially the same as the thickness of the original glass sheet.

BACKGROUND OF THE INVENTION

In the past it has been known to press-form or sag glass sheets into rather smoothly rounded or gently curved articles, such as windshields for automobiles; however, with the known technology it has not been possible to form intricate articles having abrupt curvatures and flanges. The art taught that the maximum temperature to which the sheet glass could be heated must be below the softening point of the glass, or else the sheet would elongate and deform before an article could be formed therefrom. Accordingly, this restriction in the prior art with respect to the maximum amount of heat which could be applied, by necessity severely limited the application of the process to gentle curves, since at such temperature the glass could not be deformed into intricate shapes with rather sharp bends without fracturing the glass.

It thus can be seen that the industry has been plagued with a problem which has been compounding itself, since there was no technology available for heating the glass above its softening point without a resulting deformation of the glass sheet before forming. Accordingly, the maximum temperatures utilized, being below the softening point, together with the fact that there was no suggestion of pre-heating the forming members to about the annealing point of the glass, added to the problem of forming complex articles from such viscous sheet without obtaining cold fracture. U.S. Pat. 3,333,935, which sets forth the state of the art, recognized the problem that complex bends and shapes could not be formed utilizing customary heating methods, and accordingly applied additional localized heat at the pressing station just prior to forming the article in order to obtain an article with rather sharp bends and curvatures. However, this process has not been entirely satisfactory, since not only does it require an additional heating step, but also the localized heating has a tendency to induce stresses which must be subsequently removed.

SUMMARY OF THE INVENTION

The present invention represents a complete departure from the teachings of the prior art, since the sheet glass suspended in a vertical plane is rapidly heated to a temperature above its softening point, and is quickly press-formed by forming members maintained at a temperature between the annealing point of the glass and 150° C. therebelow. The sheet is uniformly subjected to high-temperature radiation simultaneously through both sides during the heat-up, and due to the fact that it is quickly brought up to temperature, only an insignificant amount of viscous deformation occurs before the sheet is formed to shape.

The sheet is rapidly transferred from a heating to a pressing chamber, and accordingly pressing normally begins while the sheet is at or above its softening point, and since the forming members are held at the annealing point of the glass or within 150° C. therebelow, it is possible to severely deform the sheet into intricate articles having sharp bends, without cold shocking or cracking the glass as in the past. Further, the forming members are mated and radiused to pull or flow the sheet into the mold cavity in such a manner so that the finished article has substantially the same uniform thickness as the original sheet.

It has been an object of the present invention to overcome the problems of the prior art in forming intricate articles from sheet glass, and provide novel method and apparatus for producing improved articles having uniform cross section.

DESCRIPTION OF THE DRAWINGS

FIG. 5 is a top plan view in section illustrating apparatus for trimming a newly formed article from the sheet glass.

FIG. 6 is a top plan view in section illustrating a further embodiment of apparatus for trimming a newly formed article from the sheet glass.

DESCRIPTION OF THE PREFERRED EMBODIMENTS

Figure 1:
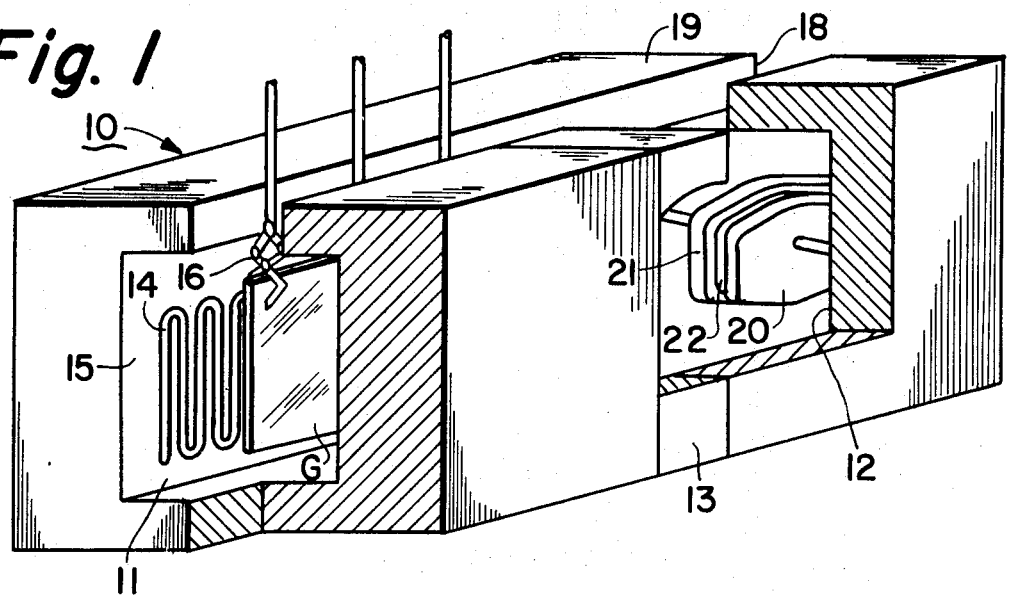
FIG. 1 is a somewhat schematic cutaway perspective view of apparatus for heating and forming sheet glass in accordance with the invention.

Referring now to FIG. 1, a refractory housing 10 is shown having a heating chamber 11 and a press chamber 12 separated by a sliding refractory door 13. Suitable electric heating elements 14 are provided in the sidewalls 15 of the heating chamber 11. A plurality of hanger members 16 are shown suspending a sheet of glass G in a vertical plane within the heating chamber. The hanger members 16 have rods which extend upwardly through a longitudinally extending slot 18 in the roof 19 of the refractory housing 10. The rods engage an overhead support described hereinafter, which may be encased in refractory material in such a manner so as to enclose slot 18 and prevent heat losses from the heating chamber 11 and press chamber 12. A pair of forming members, including a plunger 20 and a mold or die 21 having a cavity 22, are shown positioned for relative movement within the press chamber 12.

Figure 2:
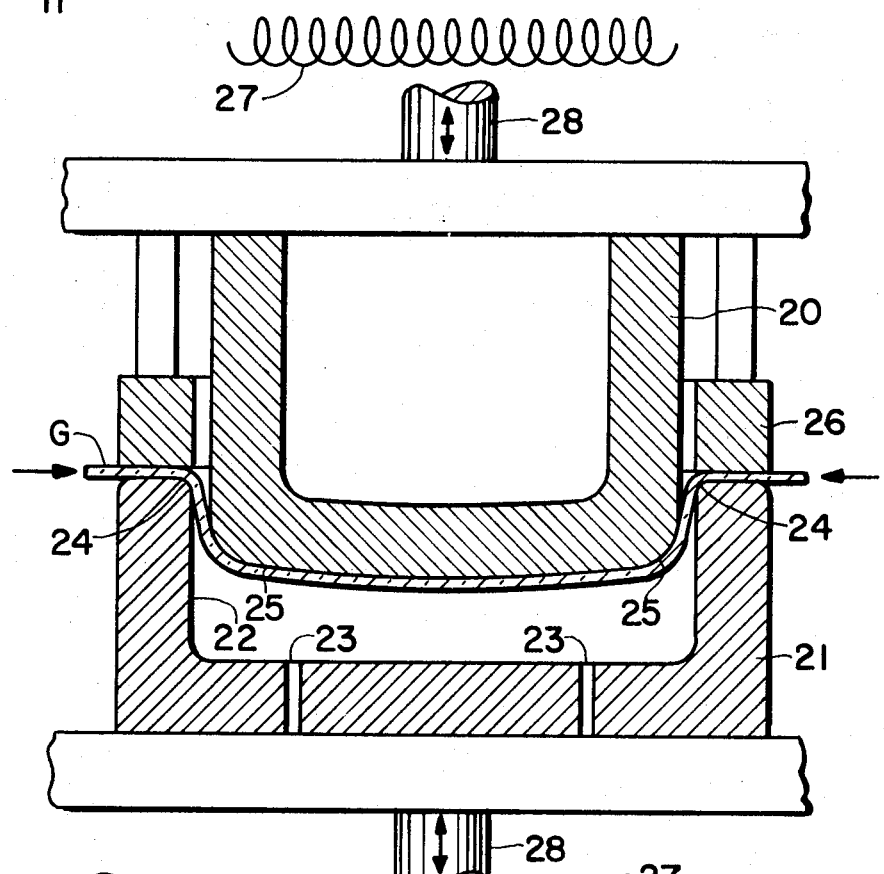
FIG. 2 is a plan view, partially in section, of forming members embodying the invention.

Although it will be appreciated that the forming members may vary considerably in their particular form and mounting means, one preferred embodiment is shown in FIG. 2. All of the forming members, regardless of their particular configuration or mounting means, are positioned for relative movement in a horizontal plane to cooperably engage opposite sides of a vertically suspended heat-softened glass sheet G. The forming members normally consist of a plunger 20, the face of which may make full contact with the glass, and a cavity style mold or die 21 which may only make limited contact with the glass. As shown, the mold 21 is provided with a radiused entrance 24 to is cavity 22, which may be spaced from the operating face 25 of the plunger 20.

A ring 26 is shown for use in the final forming of edge portions of an article such as flanges, rims, etc. A plurality of vacuum ports 23 may be formed in the mold 21 to communicate with the cavity 22, so as to retain a formed article therewithin after it has been trimmed from the remaining sheet in a manner described hereinafter. The press chamber 12 is provided with suitable electric heaters 27 to maintain the forming members 20, 21 at about the annealing temperature of the glass, and conventional piston-operated means 28 are provided for cooperatively moving the plunger and the mold in a horizontal plane relative to one another as indicated by the double headed arrows.

In operation of the apparatus thus described, a sheet of glass G is supported in a vertical plane by a plurality of specially designed hanger members 16, to be described hereinafter, which transfer the sheet along an overhead supporting rod into heating chamber 11. The chamber is maintained at a temperature substantially above the softening temperature of the glass by means of heating elements 14 located in its vertical walls. The cold glass which is placed into this chamber absorbs heat by radiation through its surfaces at a very high rate. Since the glass is heated evenly through both sides along the extent of its plane and throughout its thickness, thermal stresses do not develop which could cause it to fracture. The glass is quickly brought up to a temperature above its softening point, which could be referred to as its transfer temperature. Due to the quick heating cycle, the glass spends a very short time between its annealing temperature and transfer temperature, and accordingly no detrimental amount of viscous elongation can occur. Further, the hanger members 16 are designed to permit thermal expansion of the glass longitudinally in its vertical plane without causing warping or buckling.

When the glass has reached its transfer temperature it is conveyed along an overhead rail by means of hanger members 16 from the heating chamber 11 to the press chamber 12, upon the opening of refractory door 13. The electric heaters 27 within the press chamber preferably maintain the forming members 20, 21 at the annealing point of the glass sheet G. If the plunger and the mold are much higher than the annealing point, the glass has a tendency to stick to the forming members, thus resulting in the formation of unacceptable articles. Parting agents could be employed at these higher temperatures to eliminate adhesion, however they tend to produce poor surface quality. Normally, when the forming members are maintained at a temperature substantially below the annealing point of the glass, there is a tendency to cold shock the surface of the glass and produce cold fractures.

However, when the glass is not formed to intricate shapes, or is of a lower expansion composition, or is pressed with an insulator such as ceramic formers, it is possible to successfully form high quality articles with the temperature of the forming members maintained between the annealing temperature of a glass and 150° C. therebelow. Although the time taken to transfer the glass sheet of the heating chamber to the press chamber is relatively short, the glass loses some of its heat content. By properly selecting the transfer temperature, however, the average cross sectional temperature of the sheet will only drop to about its softening point. As soon as the sheet is transferred to the press chamber, the hot plunger and mold members cooperate to begin forming the glass.

The forming operation may be described as a controlled feeding of sheet glass in a plastic state into a mold cavity. The plunger 20 initially engages one surface of the sheet and pushes the opposite surface of the glass against the radiused periphery 24 of the cavity style mold 21. As the plunger 20 continues its movement into the mold 21 it inflows or pulls the glass G over the smoothly curved radiused entrance 24 into the cavity 22. In other words, the whole sheet moves with the plunger so that the final article is substantially the same thickness as the original sheet, as opposed to a drawing or attenuating process wherein the resulting article is substantially thinner. The surface of a glass in contact with the operating face 25 of the plunger and that portion contacting the radiused entrance 24 is chilled, which increases the surface viscosity and thus the surface strength of the glass by placing the surfaces in a thermally compressed state relative to the inner body of the glass, and accordingly the glass will not tear or elongate as it is being pulled into the mold cavity.

Since the sheet must flow or be pulled into the cavity uniformly in all directions, the specially designed hanger members 16 not only allow the sheet to move in a vertical direction, but also permit horizontal movement in the longitudinal plane of the sheet. The plunger 20 pulls the glass to a proper depth within the cavity 22 without bottoming on the mold 21 at any point, and accordingly the glass contour is made up of the plurality of tangent lines between the radiused portions 24, 25 of the mold and plunger. The depth to which the glass is pulled may be governed by simply squeezing the plunger and mold rims together about the glass periphery, or if desired a positive stop may be applied to the plunger. A ring 26 is preferably utilized in order to smooth out the periphery of the glass which may otherwise remain slightly wrinkled due to the pulling effect.

The particular temperatures maintained in the heating chamber and press chamber depend upon the composition and thickness of the glass sheet being shaped. Of course, the heating chamber should be maintained at a temperature above the softening point of the glass, and the press chamber maintained within a temperature range of between the annealing temperature of the glass and 150° C. therebelow. For soda-lime glass I have found that the heating chamber may be held at a temperature of between 1000°–1100° C., and the press chamber at about 450° C. to 500° C.

The particular duration of the heating cycle not only depends upon the composition and thickness of the glass, but also upon the amount of bending or pulling which the glass will be subjected to during the pressing cycle. As an empirical rule, when producing a complicated shape by fairly deep pulling of the glass, each .1 inch of thickness must be preheated for 1 minute. In contrast, when producing a simple single axis bend of perhaps 15–20° of arc, it only requires about one-half of the stated heating time for the same thickness of glass. After the glass is formed to shape in the press chamber, it remains in the mold set until it has cooled to the proper temperature. Again, the time for cooling is dependent upon the thickness and final contour of the article, and generally every .1 inch of glass thickness should be cooled for about 8 seconds.

Figure 3:
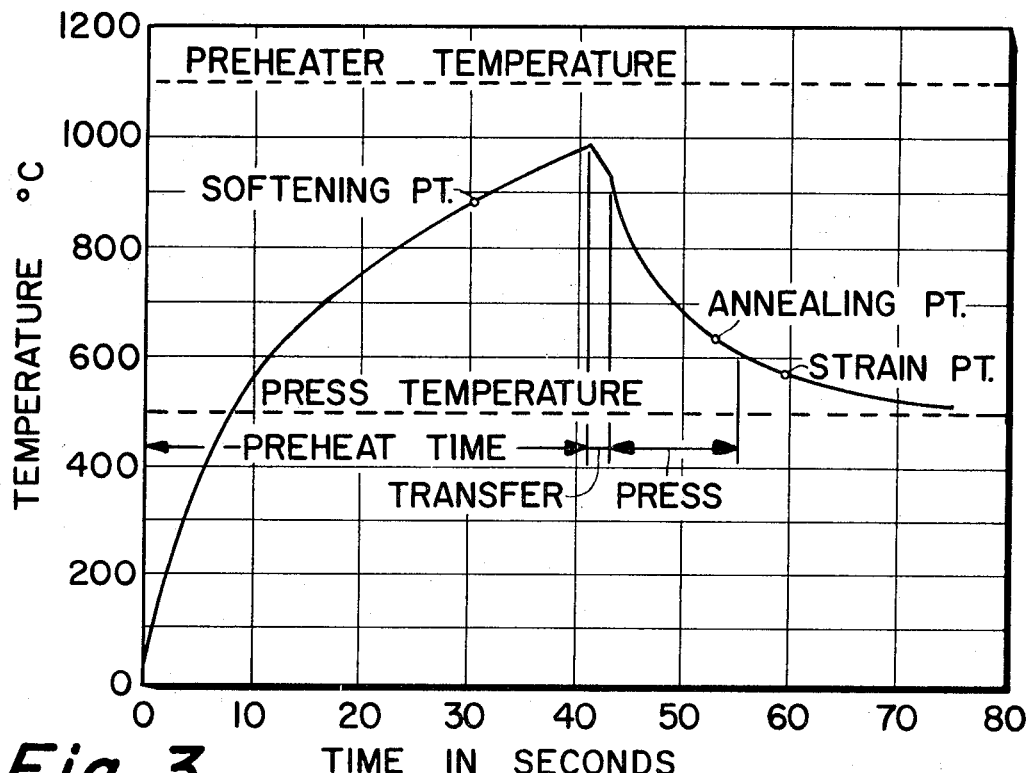
FIG. 3 is a graph illustrating a time and temperature relationship utilized in forming articles from a .060 inch thick sheet of soda-lime glass.

Referring now to FIG. 3, a specific example is given with respect to the formation of a headlight cover from a .060 thick sheet of soda-lime glass utilizing apparatus shown in FIG. 2. The glass was supported in a vertical plane by a hanger means and indexed into the heating chamber which was held at a temperature of 1100° C. The glass reached its softening temperature in about 30 seconds, and in about 41 seconds reached a transfer temperature of 980° C., whereupon it was transferred to the press section before significant viscous elongation could occur. During the two seconds transfer time the glass lost about 30° C., but as noted, the pressing began while the glass was still above its softening point. The glass then rapidly cooled as the forming members, held at about 500° C., began making positive contact with the glass during the press cycle. The glass was allowed to stay in the mold set for approximately 12 seconds, during which time the glass cooled to between its annealing and strain point. Immediately after the article is formed, it may be sheared from the surrounding sheet in a manner described hereinafter. The article is retained within the cavity 22 by means of vacuum applied through ports 23 for subsequent removal after the forming members have been opened and the used or scrap sheet transferred out of the press chamber.

Figure 4:
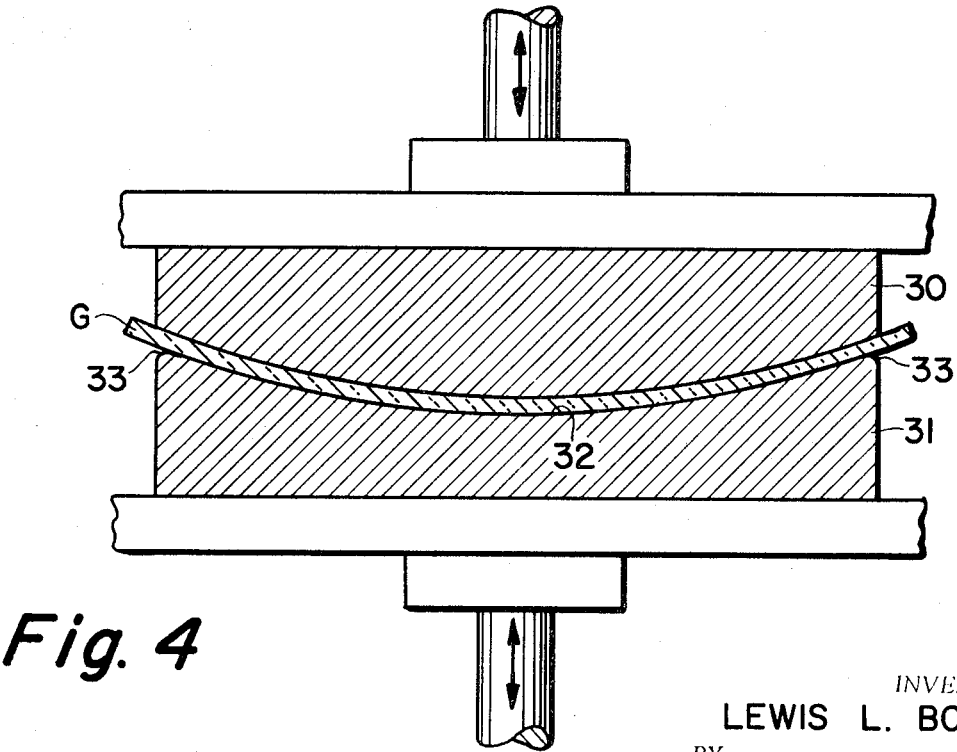
FIG. 4 is a top plan view, partially in section, illustrating a further embodiment of forming members utilized in accordance with the invention.

FIG. 4 represents a further embodiment of the invention wherein the forming members or mold set includes a plunger 30 and a mold 31 having a gently curved cavity 32. The mold set is preferably made of stainless steel which not only provides good thermal conductivity but also excellent surface qualities. The entrance 33 to the cavity 32 is radiused so as to facilitate the pulling of the glass G thereinto by means of the plunger 30. The operation of the mold set 30, 31 is similar to that of mold set 20, 21, with the exception that both the plunger 30 and mold 31 make full contact with the glass sheet in the final pressing position; however, the thickness of the formed article is substantially the same as the original thickness of the glass G.

At the end of the pressing cycle, the glass is somewhat chilled on its formed surfaces, whereas the area of glass outside the mold set is still near its softening point. Accordingly, a shearing operation may be conveniently performed at this point to sever the newly formed article from the remaining glass sheet. The particular type of shearing utilized depends upon the heat content of the glass at the conclusion of the forming cycle, the thickness of the glass, and the heat losses during the forming procedure.

When trimming glass sheets having a thickness of about .125 inch or thicker, the glass normally has adequate thermal capacity so that the surface in contact with the die will not cool excessively. Accordingly, it is possible to utilize a shearing die or blanking tool to trim the newly press-formed article to final shape and shear it from the remaining sheet glass. The trimmed item is held in the mold by vacuum after the opening of the forming members. The article may be subsequently removed by either manual or automatic take out devices after the trim losses have been conveyed from the press chamber by the hanger members. After removal, the article now at its annealing temperature, may be placed on a fire polisher to heal small fissures which normally develop on die cut surfaces.

Glass sheets having a thickness of less than about .125 inch are generally difficult to trim with known apparatus, since the thin cross section being cut loses its heat at a high rate to the cutting dies, and accordingly pronounced fissures are produced during the trimming operation. FIGS. 5 and 6 illustrate improved cutting operations which facilitate the trimming of thin sheets of glass.

As shown in both FIGS. 5 and 6, the plunger 20 and mold 21 are provided with a trimmer or cutter 34. In order to reduce the extent of the fissures in the cross section of the glass, which are normally produced when trimming thin sheets, heat is applied to the periphery of the blanking die to reduce the heat loss from the glass. As shown in FIG. 5, heat is applied to the periphery of the blanking die by means of suitable electric heaters 35 positioned in both the cutter 34 and the periphery of the mold 21. A further method of reducing fissures as shown in FIG. 6, is to provide external heat on the surface of the glass which is sheared or fractured last, such as by suitable gas-oxygen burners 36 positioned about the periphery of the glass G adjacent the mold 21. By so heating the periphery of the glass or blanking dies, it is possible to shear articles from thin sheets of glass without producing undesirable fissures.

Figure 7:
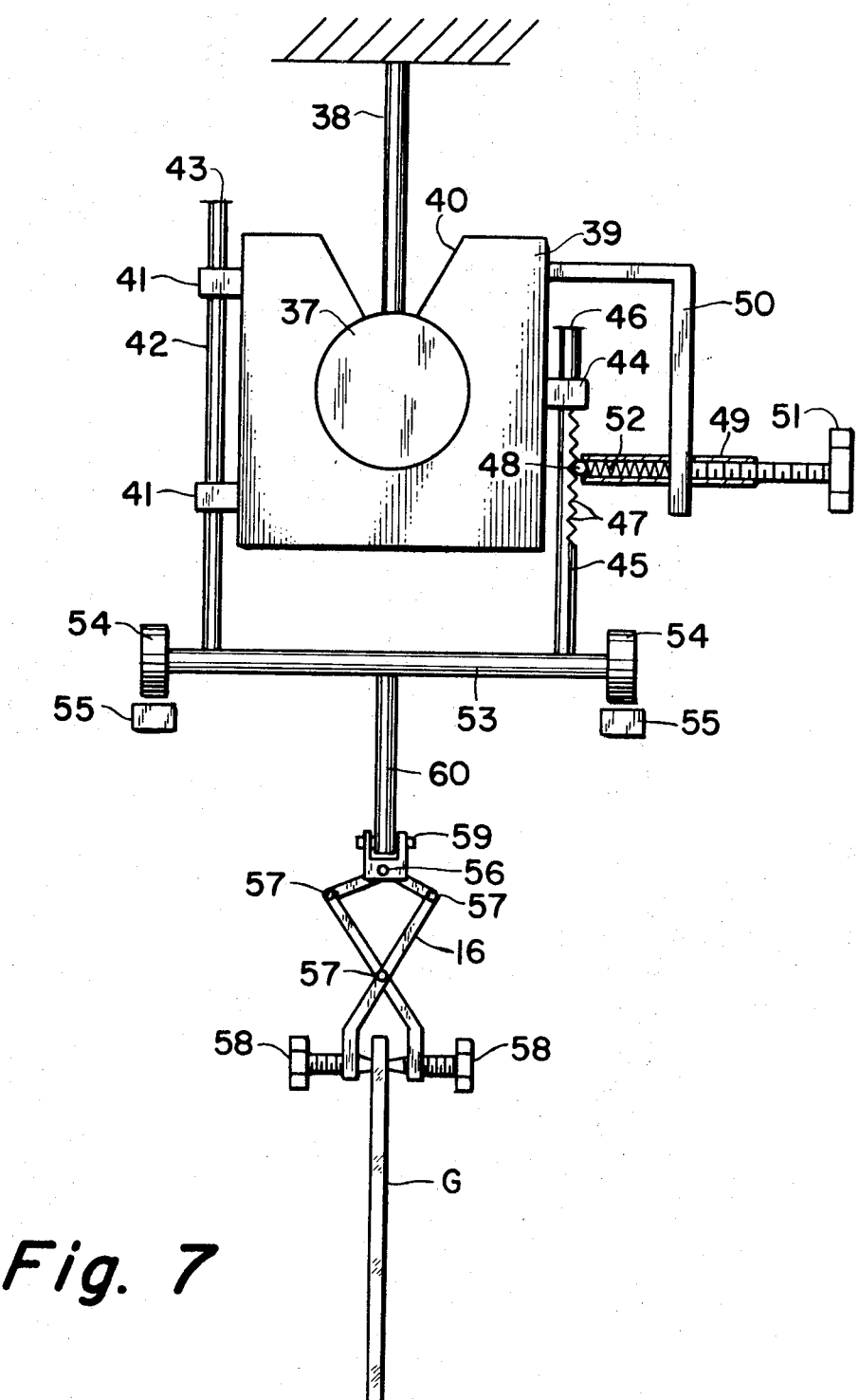
FIG. 7 is an elevational view of apparatus for holding the glass sheet in accordance with the present invention.

Referring now to FIG. 7, an improved support means is shown for suspending sheet glass in a vertical plane while facilitating both thermal and mechanical movement thereof without imparting undue distortion. An overhead support rail or shaft 37 is fixedly positioned by means of flange supports 38. A bearing block 39 is slidably positioned on support shaft 37, and has a tapered upper opening 40, which not only facilitates sliding movement of bearing block 39 past support flanges 38 along shaft 37, but also the faces of the opening 40 may be tapered to provide desired rotational stops of the bearing block 39 with respect to such flange supports.

A pair of guide blocks 41 are positioned in vertical alignment on one side of the bearing block 39, and slidably receive a slide rod 42 having an upper terminal stop 43. The opposite side of the bearing block 39 has a guide block 44 slidably receiving a control rod 45 provided with an upper terminal stop 46. The control rod 45 has a plurality of grooves 47 formed in the outer face thereof which cooperably engage with a ball or detent 48 of a frictional adjustment member 49. The adjustment member is secured to the bearing block 39 by means of a bracket 50, and has an adjustment screw 51 operably positioned in engagement with a compression spring 52 which is variably urged against the ball 48. The slide rod 42 and control rod 45 are connected together by a tie rod 53, having cam followers 54 positioned on its outer ends, which cooperably engage cam track 55.

A hanger rod 60 is suspended from tie rod 53, and has a hanger member or tongs 16 pivotally secured to the lower end thereof. A pivotal connection between hanger rod 60 and tongs 16 is made at 59 so as to permit the tongs to pivot longitudinally of the glass sheet G about a horizontal axis extending normal to the plane of such sheet. A further pivotal connection 56 permits the tongs to pivot transversely of the plane of the sheet glass G about a horizontal axis lying within the vertical plane of said sheet. The tongs 16 also have pivotal connections 57 in the customary manner so that the weight of the glass sheet G creates a locking action between the adjustable holding pins 58.

In operation, the adjustable holding pins 58 grip the glass sheet G close to its upper edge, and the sheet is supported in a vertical position by a plurality of such gravity locking tongs. Initially the tongs are applied to the sheet so that they are pivoted about pivot connection 59 toward the longitudinal center of the sheet, so that upon expansion of the sheet during heat up, the tongs may pivot about pivotal connection 59 back downwardly toward the vertical position and compensate for such expansion without inducing buckling within the sheet. Further, at the time of initially loading the sheet G, the friction lock mechanism including rods 42 and 45 are cammed to the up position by means of cam followers 54 riding on a short cam track 55 positioned in a loading zone immediately prior to the heating chamber 11.

During pressing, different regions of the sheet glass are required to move into the mold in a somewhat uniform manner so as to facilitate the pulling of the glass into the mold by the plunger without distortion and wrinkling. The friction lock mechanism on the tongs created by varying the position of adjustment screw and accordingly the amount of pressure exerted through spring 52 by ball 48 on grooves 47 allows the glass to move differentially in the vertical direction at the support points, so that when a glass is pulled into the mold it will not be restrained in such vertical direction. The friction locking or adjusting member 49 is adjusted so that the weight of the glass will not permit the tongs to move downward, but the pulling force exerted on the tongs by the action of the forming members on the sheet will permit the control rod 45 to depress ball 48 and allow the necessary vertical movement through sliding action of rods 42 and 45 in guides 41 and 44. Further, since the glass is also drawn in a radial direction, the pivotal movement about pivotal connection 59 can further be appreciated for allowing unrestricted longitudinal movement whereas pivotal movement about connection 56 maintains the glass in a vertical plane for reception by the forming members.

Although I have disclosed the now preferred embodiment of the invention, it will be apparent to those skilled in the art that various changes and modifications may

I claim:

1. A method of forming articles from sheet glass comprising, suspending a sheet of glass to be formed in a vertical plane, rapidly heating the sheet throughout its thickness to a temperature above its softening point, forming an article from said softened sheet while being suspended in a vertical plane and before detrimental elongation can occur, and prior to such forming maintaining the forming members at a temperature between the annealing point of said glass sheet and 150° C. therebelow.

2. The method of forming articles as defined in claim 1 wherein the forming of the article is commenced while said glass sheet is at a temperature above its softening point.

3. The method of forming glass articles as defined in claim 1 wherein said articles are pressed-formed and said sheet glass is approximately at its annealing point upon the completion of said press forming.

4. In a method of forming intricate articles having relatively severe curvatures and radiuses from vertically suspended softened sheets of glass so as to provide finished articles having a thickness substantially equal to the thickness of the initial sheet wherein the improvement comprises, suspending a sheet of glass in a vertical plane for both longitudinal and vertical movement thereof within the plane of such sheet, rapidly heating said sheet glass throughout its thickness to a temperature above its softening point, engaging opposite surface portions of said heat-softened sheet with forming members so as to pull such sheet into a forming cavity, flowing the sheet into such cavity from its bounding periphery in a substantially unrestricted manner, and forming an article therein having a thickness substantially equal to the thickness of the glass sheet.

5. The method of forming articles as defined in claim 4 including the steps of trimming the newly formed article, while it is retained by the forming members, from the remainder of the sheet; separating the forming members while retaining the newly formed article in the cavity thereof by vacuum so as to facilitate the removal of the excess sheet material; and releasing said vacuum to facilitate the removal of the newly formed article from the cavity.

6. The method of forming articles as defined in claim 5 wherein heat is applied to the periphery of the sheet glass abounding the forming members prior to shearing, so as to facilitate shearing without the formation of detrimental fissures.

7. Apparatus for forming articles from glass sheet comprising, means for vertically suspending a sheet of glass while permitting both longitudinal and vertical movement thereof within its plane to compensate for both thermal and mechanical forces exerted thereon, means for rapidly heating said sheet through both its sides to a temperature above its softening point, forming means for pulling said heat-softened glass into a forming cavity from about the periphery thereof while maintaining a substantially constant glass thickness, and means for maintaining said forming means at a temperature between the annealing point of said sheet glass and 150° C. therebelow.

8. The apparatus for forming articles as defined in claim 7 wherein said forming means comprises stainless steel plunger and mold members relatively movable with respect to one another in a horizontal direction, normal to the plane of the glass sheet, so as to engage such sheet and provide improved surface qualities while eliminating glass sticking.

9. Apparatus for forming articles as defined in claim 7 including means for shearing a newly formed article from the remainder of the sheet while said article is retained within said forming cavity, means for retaining the sheared article in said cavity, and means for heating peripheral portions of such sheet about said forming means so as to facilitate the operation of said shearing means.

References Cited

UNITED STATES PATENTS

| | | | |
|---|---|---|---|
| 3,004,295 | 10/1961 | Bottoms | 65—106 |
| 3,484,225 | 12/1969 | Bognar | 65—104 |
| 2,970,405 | 2/1961 | Giffen | 65—107 |
| 3,281,227 | 10/1966 | Leflet | 65—107 |
| 3,418,098 | 12/1968 | Kirkman | 65—106 |
| 3,421,875 | 1/1969 | Kirkman | 65—106 |
| 3,454,298 | 7/1969 | Bognar | 65—106 |

S. LEON BASHORE, Primary Examiner

J. B. HARDAWAY, Assistant Examiner

U.S. Cl. X.R.

65—104, 106, 273, 275, 288, 290